United States Patent [19]

Gilardoni et al.

[11] Patent Number: 4,734,822

[45] Date of Patent: Mar. 29, 1988

[54] ELECTRONIC CIRCUIT ENSURING PROTECTION AGAINST ELECTRICAL DISCHARGE, IN PARTICULAR FOR HAIRDRYERS

[76] Inventors: Giovanni Gilardoni, Via Statale Bergamina, 23; Sergio Gilardoni, Via Defendente, 17, both of 20075 Lodi (Milano), Italy

[21] Appl. No.: 897,834

[22] Filed: Aug. 19, 1986

[30] Foreign Application Priority Data

Sep. 13, 1985 [IT] Italy .................. 22142 A/85

[51] Int. Cl.$^4$ .............................................. H02H 9/08
[52] U.S. Cl. ...................................... 361/42; 219/369
[58] Field of Search ................ 307/118, 320; 361/42, 361/47, 50; 219/363, 364, 369

[56] References Cited

U.S. PATENT DOCUMENTS

| | | | |
|---|---|---|---|
| 3,525,902 | 8/1970 | Davidson et al. | 307/118 |
| 4,270,158 | 5/1981 | Gilardoni et al. | 361/42 |
| 4,464,582 | 8/1984 | Aragaki et al. | 307/118 |
| 4,550,358 | 10/1985 | Crowley et al. | 361/42 |

Primary Examiner—A. D. Pellinen
Assistant Examiner—Jeffrey A. Gaffin
Attorney, Agent, or Firm—Young & Thompson

[57] ABSTRACT

An electronic safety device, for example for the current feed of a hairdryer or similar domestic electrical appliance, shuts off the appliance in the presence of moisture or water on electrically conducting parts thereby avoiding a dangerous short circuit. A pair of closely spaced grids is provided, each of which is in series between a pair of connection wires that trip a control circuit which normally maintains energized a relay for closing a control switch of an electrical feed line of the appliance. A supplementary control current continuously flows through each grid and its associated wires.

3 Claims, 1 Drawing Figure

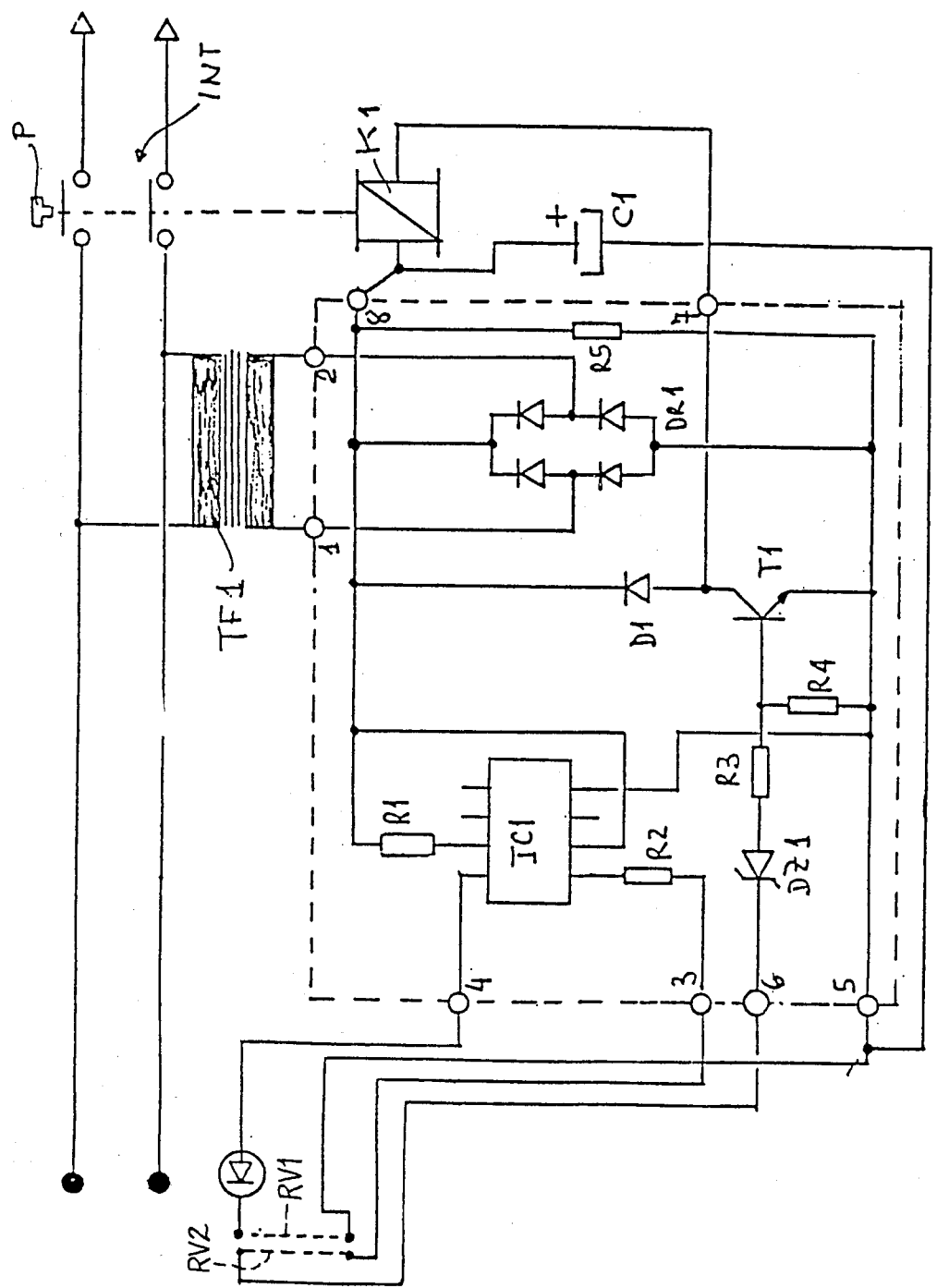

ELECTRONIC CIRCUIT ENSURING PROTECTION AGAINST ELECTRICAL DISCHARGE, IN PARTICULAR FOR HAIRDRYERS

BACKGROUND OF THE INVENTION

EP-A No.-0001831 filed Feb. 11, 1978 with the same inventors of the present application describes a hairdryer provided with a safety device which, by means of an electronic control and tripping circuit, instantly interrupts electrical feed to the hairdryer should conditions arise—such as the presence of moisture or water on electrically conducting parts—which could cause short-circuiting or, more dangerously, electrical discharge through the user's body.

This device is based on the use—as moisture or water sensing element—of a pair of parallel, slightly spaced-apart metal grids which are electrically isolated from each other and are connected individually to the control and tripping circuit by conductor wires. One pair of grids is disposed in correspondence with each air inlet or outlet aperture of the hairdryer.

The operation of this device is perfect, both with regard to response time and with regard to the certainty of the circuit remaining de-energized and of the electrical feed to the hairdryer remaining cut off for the entire time during which water or moisture is present on the sensing grids.

In the industrial production of hairdryers in accordance with EP-A- No. 0001831, in which the requirement of a high production rate does not always permit maximum care in manufacture, it has however been found that an item of possible risk is the connection between the sensing grids and the control circuit. As stated, each grid is connected to the control and tripping circuit by a fairly thin conductor wire soldered at one end to the grid and at the other end to one of the circuit terminals. If one of these wires should become accidentally interrupted, or if one of the respective soldering points should succumb—which could happen not only during manufacture but also during use—the respective control grid would remain isolated and therefore be no longer able to perform its function.

In DE-A- No. 3122232 is described a device similar to that of EP-A- No. 0001831; however from the very schematic description it is clear that this device has not solved the problem, which is at the base of the present invention.

SUMMARY OF THE INVENTION

The object of the present invention is then to obviate any possible risk, deriving from manufacturing defects. This result is attained in that each of the two grids is connected to the control circuit not by a single conductor wire but by a pair of conductor wires, through which a supplementary control current constantly flows, accidental interruption of the circuit formed by the grid and the two connection wires causing tripping of the control circuit.

DESCRIPTION OF THE PREFERRED EMBODIMENT

Further characteristics and advantages of the circuit according to the present invention will be more apparent from the detailed description given hereinafter of one possible embodiment of the circuit, shown by way of example on the accompanying drawing.

As shown, the control and tripping circuit comprises, in the manner already described in said EP-A- No. 0001831, a relay K1 controlling a switch INT which can itself be operated by a pushbutton P. When the pushbutton P is pressed, the switch INT is closed and feeds the electronic control and tripping circuit by way of the transformer TF1 and rectifier DR1.

This circuit comprises basically a transistor T1 which controls the feed to the relay K1. When the electronic circuit is operative, a current circulates through the transistor T1 and relay K1 so that this latter is activated and keeps the switch INT closed. As soon as a tripping signal is produced, the transistor T1 ceases to conduct, the relay K1 is desactivated and the switch INT opens.

According to said EP-A- No. 0001831, the tripping signal is produced —when short-circuiting occurs between the sensing grids—by virtue of a second transistor upstream of T1 becoming inhibited and thus also inhibiting the transistor T1, to deactivate the tripping circuit.

According to the present invention, upstream of the transistor T1 there is instead disposed an integrated circuit IC1—for example of the FCD810 type produced by the firm FAIRCHILD (U.S.A.) or the TI-L116 type produced by the firm TEXAS INSTRUMENTS (U.S.A.)—and in addition, the sensing grids RV1 and RV2 are connected to the circuit each by means of two conductor wires, the grid RV1 being connected by the wires 4 and 5, and the grid RV2 being connected by the wires 3 and 6.

The circuit is connected in such a manner as to obtain the following operation:

CIRCUIT ACTIVATED a current circulates through a first section of the integrated circuit IC1 by way of the resistor R1, IC1, wire 4, grid RV1 and wire 5 connected to earth;

this current circulation through the first section of the integrated circuit IC1 also ensures that a current circulation is maintained through the second section of IC1 by way of the resistor R1, IC1, resistor R2, wire 3, grid RV2, wire 6, diode DZ1 and resistors R3 and R4, the effect of the current circulation through R4 is to keep the transistor T1 under conduction, to thus also maintain the relay K1 energized.

CIRCUIT DEACTIVATED if an interruption occurs in 4 or 5 the feed voltage to IC1 fails, the first section of this latter is deactivated, and also blocks the operation of its section section. The control voltage at the base of T1 also fails, with the result that this latter becomes inhibited, to de-energize the relay K1;

if an interruption occurs in 3 or 6 the control voltage at the base of T1 immediately fails, this becoming inhibited in the aforesaid manner;

if short-circuiting occurs between the grids RV1 and RV2 (this case is already included in said EP-A- No. 0001831, the wire 6 becomes connected to earth by way of the wire 5, and the resistors R3 and R4 together with DZ1 become short-circuited to earth, with the result that the base T1 is again earthed and T1 no longer conducts.

The invention is not limited to the particular embodiment described and illustrated, nor to the specific use in a hairdryer, and constructional modifications and various other uses in the domestic electrical appliance field are applicable thereto, as can be easily implemented by an expert of the art within the scope of the stated inventive concepts.

We claim:

1. An electronic safety device of the type comprising a pair of parallel, slightly spaced-apart metal sensing grids, and an electronic control and tripping circuit which maintains energized a relay for closing a control switch of an electrical feed line, each of the two grids being connected to the electronic control and tripping circuit by a pair of connection wires through which a supplementary control current constantly flows, accidental interruption of one of two circuits each formed by a grid and two respective connection wires causing tripping of said control circuit, each said grid being in series between its associated said two connection wires.

2. A device as claimed in claim 1, comprising an integrated circuit having a first section through which there flows a first control current passing through a first sensing grid and the respective pair of said connection wires, and a second section the operation of which depends on the operation of said first section and through which there flows a second control current passing through a second sensing grid and the respective pair of connection wires, this second current forming a maintaining signal for the base of a transistor which controls an energization circuit of said closure relay.

3. A device as claimed in claim 1, wherein short-circuiting between the two sensing grids causes the maintaining signal of the control transistor base to flow to earth.

* * * * *